United States Patent Office 3,629,186
Patented Dec. 21, 1971

3,629,186
POLYOLEFIN PIGMENT CONCENTRATES
David C. Hull, Hugh J. Hagemeyer, Jr., and Raymond L. Etter, Jr., Longview, Tex., assignors to Eastman Kodak Company, Rochester, N.Y.
No Drawing. Continuation of application Ser. No. 314,874, Oct. 9, 1963. This application May 19, 1969, Ser. No. 827,120
Int. Cl. C08f 29/12
U.S. Cl. 260—41 R                4 Claims

ABSTRACT OF THE DISCLOSURE

A concentrate for dispersing particulate materials, such as pigment, in polymeric masses includes low molecular weight crystalline polypropylene having an inherent viscosity within the range of 0.2 to 1.1 and amorphous polypropylene having a viscosity at 150° F. of from 5,000 to 300,000 cps.

---

This is a continuation of application Ser. No. 314,874, filed Oct. 9, 1963.

This invention broadly relates to improved systems for dispersing particulate materials in polymeric masses, and especially concerns their manufacture and use in the form of color concentrates comprising pigments dispersed in improved resinous carriers. While the present invention is useful for filling and extending polymeric masses in general, it can be adequately described by reference to its use in the pigmentation of polyolefins, and such description shall henceforth be given for the sake of simplicity rather than limitation. The term "pigment" as hereinafter used includes all kinds of particulate organic and inorganic coloring materials.

Color concentrates comprising pigmented carriers such as thermoplastic resinous materials are conventionally blended with polymeric materials including polyolefins to impart color thereto. In the use of such concentrates, the homogeniety or uniformity of the pigment dispersion in the final product depends, of course, on the uniformity of the pigment dispersion in the pigment carrier. For example, if agglomerated pigment particles are present in the concentrate, agglomerated pigment will exist in the final article and detract from its appearance, i.e., render the color grainy and non-uniform. While in most instances the prior art concentrates have been satisfactory, they have not overcome the agglomeration problem in the coloring of such polyolefins as polypropylene which wets pigment particles only poorly and prevents proper dispersal thereof.

Objects of the present invention, therefore, are: to produce polymeric articles having uniform dispersals of pigment therein and essentially no agglomerates; to provide pelleted color concentrates exhibiting improved pigment dispersions and amenable to low-cost blending with resin systems; and to provide color concentrates useful for coloring a large variety of resinous materials, thereby reducing the number of concentrate types heretofore required for large-scale and varied coloring operations.

These and other objects have been achieved according to the present invention through the discovery that blends of amorphous polypropylene and low-molecular-weight crystalline polypropylene readily wet out pigment particles, effectively inhibit agglomeration thereof, and can be formed into non-tacky, shippable pelleted color concentrates. The inherently low viscosity of these mixtures and their pigment wetting propensities render uniform coloring thereof a relatively simple matter. The amounts of amorphous polypropylene in the carrier composition can range from 10–90 percent by weight with the preferred amorphous content for about 30% pigment content being from about 30 to about 50 percent by weight. Concentrates containing as high as 60% pigment have been prepared with a 4/3 weight ratio of amorphous to low molecular weight crystalline polypropylene. The equipment necessary for forming such concentrates is simple and inexpensive due to the relatively low viscosity of these carriers and their ability to properly disperse the pigment at temperatures between 100 and 250° C.

The amorphous polypropylene utilized in the blends of this invention can vary widely in viscosity. Viscosities from 5,000 to 300,000 cps. at 150° C. can be used with the preferred range being 20,000 to 200,000 cps. at 150° C. Such amorphous material comprises a linear head-to-tail polymer with random arrangement of the asymmetric carbon atoms. The following examples illustrate its preparation. However, it must be noted that many processes and catalysts other than specifically disclosed in the examples may be used to make amorphous polypropylene applicable to the present invention.

(A) A mixture of 500 ml. of heptane, 5.0 ml. of ethyl aluminum sesquibromide and 3.75 ml. of tetra-2-ethylhexyl titanate was prepared in a nitrogen atmosphere. While stirring this mixture propylene gas was introduced over a period of about 2 hours. The temperature rose to about 60° and was maintained between 50–60° C. The product contained about 65% amorphous polymer extractable with hexane and having a viscosity at 150° C. of about 25,000 cps.

(B) An 82-gallon stirred autoclave is purged with propylene and charged with 40 gallons of mineral spirits. Twenty grams lithium aluminum hydride, 22 g. of sodium fluoride and 80 g. of titanium trichloride are charged to the reactor and propylene is added to bring the pressure to 100 p.s.i.g. The vessel is heated to 150° C. and propylene is fed to bring the pressure to 450 p.s.i.g. After six hours at 450 p.s.i.g. and 150° C., unreacted propylene is vented. The product contains about 15% amorphous polymer extractable with hexane and has a viscosity at 150° C. of about 11,000 cps. The crystalline polypropylene utilized in this invention can be either one of two types. The first may be made directly in the reactor and can vary in inherent viscosity from 0.2 to 1.1. The other by the thermal degradation of high molecular weight conventional polypropylene and may vary in inherent viscosity from 0.2 to approximately 1.1.

The low-molecular-weight crystalline polypropylene may be made directly in the polymerization reactor to an I.V. of 0.2–1.1 measured in Tetralin at 145° C. The polymerization may be carried out at a temperature in the range of about 0 to about 300° C. and a pressure from about 1 to about 2,000 atmospheres in the presence of a solid stereospecific polymerization catalyst, one component of which being a halide of a transition metal from Group IV–B to Group VI–B of the Periodic Table and the second component being selected from the following: (a) aluminum, (b) a metal from Group I–A to Group II of the Periodic Table, (c) alloys, halides, complex hydrides and organo derivatives of aluminum or a metal from Group I–A to Group II of the Periodic Table, and (d) a complex organo-metallic compound comprising a metal from Group I–A to Group II of the Periodic Table and either aluminum and boron. The thermally degraded polymer may be made by degrading according to the process of U.S. Pat. No. 2,835,-659, which essentially comprises heating at a temperature of 300–450° C., crystalline polypropylene having a density of at least 0.90 and an average molecular weight of at least 20,000, until the molecular weight is reduced to a value within the range of 1000–8000.

The coloring agents which are utilized in this invention are either inorganic or organic pigments or dyes. Some of the representative pigments and dyes are: copper phthalocyanines, chlorinated copper phthalocyanines, sulfonated copper phthalocyanines, alizarin pigments, quinoline dyes, titanium dioxide, and all cadmium pigments such as Cadmium yellow, Cadmium orange, and Cadmium red. Various other pigments identified only by the manufacturers' name such as Hostaperm fast red, Zulu green and Zulu blue can also be used. Excellent dispersions are also obtained using various grades of carbon black.

Various antioxidant combinations may be used in the concentrates. We prefer to use additional antioxidant for the polypropylene where greater stabilization is required for the processing. The preferred loading is 0.5% dilauryl thiodipropionate and 0.3% Santowhite powder (Monsanto Chemical Company) or other suitable phenolic-type antioxidant. On some of the pigments such as the copper salts we prefer to add corrosion inhibitors such as oxanilide to prevent agglomeration by the interaction of the copper with the polypropylene.

The incorporation of the colorant in the carriers of this invention is achieved by two general methods; melt blending, and solvent blending. Melt blending involves melting the carrier in a melt pot or mixer such as a sigma blade mixer at temperatures in the range of 150-250° C. The colorant is then added in small portions to the agitated melt in order to insure good dispersion. The agitation should be thorough but need be neither rapid nor of high shear. After colorant addition is completed, agitation is continued until the complete dispersion thereof is obtained. The concentrate is then removed by pumping or extruding into cooling troughs, stranded and then cut into pellets. The solvent blending method involves adding small quantities of a solvent such as mineral spirits or xylene to the carrier and heating the resultant mixture to the solution point at which time the colorant in solvent is added to the agitated solution. After complete mixing has been achieved, the solvent is removed by distillation or gas stripping and the molten concentrate is treated as in the melt method above.

EVALUATION OF THE DISPERSIONS

Illustrative concentrates of the present invention were evaluated according to the following three procedures:

Procedure I: Concentrate samples were prepared for magnified viewing by placing small amounts thereof between two glass slides, heating the same to a temperature of 150-200° C., pressing the slides together with a 3000-gram weight and allowing the concentrate to cool. The samples thus prepared were then observed under 100× magnification and photomicrographs thereof taken. Dispersion qualities of the samples were judged according to two aspects, namely, (a) the color uniformity of the dispersion of the pigment particles and (b) the absence of pigment particle agglomerates. A quality rating of from Grade 1 to Grade 10 was applied to the samples with Grade 1 indicating excellent uniform pigment particle dispersion and essentially no particle agglomerates.

Procedure II: The above concentrate samples were then mixed (extended) by an extruder into polyolefin resins to pigment concentrations of about 1% by weight. The dispersion qualities (a) and (b) of samples of these pigmented polyolefin resins were determined as in Procedure I above, using small amounts of the colored polyolefin resins in the slide samples, and likewise given a rating of from Grade 1 to Grade 10.

Procedure III: The polyolefin resins of Procedure II above were then extruded into flat film samples which were evaluated according to four aspects; (a), (b), (c), and (d), and given a rating of from Grade 1 to Grade 10. Aspects (a) and (b) were determined by Procedure II above, using small amounts of the colored polyolefin resin films in the slide preparations. Aspect (c) consisted of a non-magnified visual determination of the uniformity of color of the film samples, and aspect (d) consisted of a non-magnified visual determination of the presence of pigment specks in the film samples. In these grade ratings, aspects (a) through (d) were given equal weight.

The following specific examples wherein the concentrates were extended to 1% by weight pigment concentration in polypropylene (I.V.=1.8) will serve to further illustrate the invention.

Example 1

To a 2-liter resin kettle fitted with an anchor-type stirrer were added 400 grams of amorphous polypropylene (viscosity 150° C.=156,000 cps.; I.V.=0.35) and 300 grams of low-molecular-weight crystalline polypropylene (viscosity at 190° C.=4000 cps., I.V.=0.54). This mixture was heated and agitated at about 200° C. until the polymers were molten and fluid, at which point 300 grams of Zulu green (a copper phthalocyanine pigment) was added in 30 to 50 gram portions. After pigment addition was complete, the agitation was continued for four hours, after which the concentrate was poured into a pan, allowed to cool, and then granulated. Dispersion quality evaluation of the concentrate was excellent (Grade 4), of the extended concentrate was excellent (Grade 2), and of the film was excellent (Grade 2). Plates molded from this concentrate, and polymeric film containing the same in extended form also showed a greater depth of color for the same pigment concentration than those prepared by the Banbury method.

Example 2

This example demonstrates the results obtainable with pigment concentrates prepared by the Banbury method. A conventional Banbury mill was used to disperse 30% Zulu green pigment in conventional crystalline polypropylene (I.V.=1.8). A milling time of 30 minutes was used after which the concentrate was removed and diced. This material was evaluated as in Example 1. The dispersion quality of the concentrate was very poor (Grade 8), of the extended concentrate, poor (Grade 8), and of the film, poor (Grade 7).

Examples 3–8

Example 1 was repeated, but, substituting a variety of pigments. The dispersion quality evaluations are shown in Table I below.

TABLE I

| Example No. | Pigment | Dispersion quality of— | | |
| --- | --- | --- | --- | --- |
| | | Concentrate | Extended concentrate | Film |
| 3 | Cadium yellow | Excellent, 2 | Excellent, 2 | Excellent, 1. |
| 4 | Cadmium orange | Excellent, 2 | Excellent, 2 | Excellent, 1. |
| 5 | Hostaperm red | Excellent, 3 | Excellent, 3 | Excellent, 2. |
| 6 | TiO₂ white | Excellent, 1 | Excellent, 1 | Excellent, 1. |
| 7 | Zulu blue | Good, 5 | Good, 4 | Good, 4. |
| 8 | Carbon black | Good, 5 | Good, 4 | Good, 4. |

Example 9

To a 4-liter resin pot was added 400 g. of amorphous polypropylene (I.V.=0.31; viscosity at 150° C.=80,000 cps.), 300 g. of low molecular weight crystalline polypropylene (I.V.=0.18; viscosity at 190° C.=425 cps.) and 200 ml. of mineral spirits. The mix was heated to effect solution of the polymers and 300 g. of Cadmium orange pigment and 200 ml. of mineral spirits were added in portions. After pigment addition was completed, the mixture was stirred for two hours and the mineral spirits then removed by distillation. The concentrate was cooled, granulated, and evaluated. The dispersion quality of the concentrate evaluated to Grade 2, of the extended concentrate to Grade 2, and of the film to Grade 2.

Example 10

To a 1-gallon heated sigma blade mixer were added 2.0 pounds of amorphous polypropylene (viscosity at 150° C.=120,000 cps.; I.V.=0.33) and 1.5 pounds of low-molecular-weight crystalline polypropylene (viscosity at 190° C.=3000 cps., I.V.=0.57). The mixer was started and when the materials became molten, one and one-half pounds of Cadmium yellow pigment was added in onefourth pound portions. After the pigment addition was complete, the mixing was continued until a sample showed good dispersion (Grade 2). The mix was then pumped from the bottom of the tank, cooled, stranded and pelleted. The dispersion quality of the concentrate evaluated to Grade 2, of the extended concentrate to Grade 2, and of the film to Grade 2.

In the following Examples 11–18 given in Table 2 the concentrates of Examples 1–8 respectively were extended

TABLE 2

| Example No.: | Extended polyallomer | Extended polyethylene | Polyallomer film | Polyethylene film |
|---|---|---|---|---|
| 11 | 3 | 3 | 1–2 | 2 |
| 12 | 7 | 8 | 7 | 7 |
| 13 | 2 | 2 | 1 | 1 |
| 14 | 2 | 2 | 1 | 1 |
| 15 | 3 | 2 | 2 | 2 |
| 16 | 1 | 1 | 1 | 1 |
| 17 | 4 | 5 | 3 | 4 |
| 18 | 4 | 3 | 4 | 3 |

NOTE.—The material in Example 12 was prepared by the Banbury milling technique for comparison purposes.

to 1% by weight pigment concentration in both polyethylene (ASTM Melt Index=8.0) and polyallomer (I.V.=1.8). Grade ratings were made as in Examples 1–8. Polyallomers are solid, crystalline polymers in which the polymer chains comprise two separate and distinct crystalline segments, i.e., a body segment and a chain segment. The polyallomers found especially useful are those containing segments of polypropylene and polyethylene, or segments of polypropylene and poly-1-butene. These polyallomers are made by initially polymerizing propylene and then polymerizing a different alpha-monoolefinic hydrocarbon such as ethylene or butene-1 in the presence of the polymerized propylene until a polymer containing at least 80 percent by weight of polymerized propylene and at least 0.1 percent by weight of the polymerized alpha-monoolefinic hydrocarbon forms. The polymerization is carried out at a temperature in the range of about 0 to about 300° C. and a pressure from about 1 to about 2,000 atmospheres in the presence of a solid stereospecific polymerization catalyst, one component of which being a halide of a transition metal from Group IV–B to Group VI–B of the Periodic Table and the second component being selected from the following: (a) aluminum, (b) a metal from Group I–A to Group II of the Periodic Table, (c) alloys, halides, complex hydrides and organo derivatives of aluminum or a metal from Group I–A to Group II of the Periodic Table, and (d) a complex organo-metallic compound comprising a metal from Group I–A to Group II of the Periodic Table and either aluminum and boron.

The invention has been described in detail with particular reference to preferred embodiments thereof, but, it will be understood that variations and modifications can be effected within the spirit and scope of the invention as described hereinabove and as defined in the appended claims.

We claim:
1. A pigment concentrate comprising at least about 30% by weight of a finely divided pigment dispersed in a carrier mixture which consists of 10–90% by weight amorphous polypropylene having a viscosity at 150° C. of from 5000 to 300,000 cps., and the remainder being low-molecular-weight crystalline polypropylene having an inherent viscosity as measured in tetralin within the range of 0.2 to 1.1

2. A pigment concentrate according to claim 1 wherein the amorphous polypropylene has a viscosity at 150° C. of from 20,000 to 200,000 cps.

3. A pelleted pigment concentrate, according to claim 1, which is non-tacky at room temperature.

4. A pelleted pigment concentrate according to claim 3 comprising about 30% of a finely divided pigment.

References Cited
UNITED STATES PATENTS 3,112,300   11/1963   Natta et al. _____ 260—93.7

FOREIGN PATENTS 879,587   10/1961   Great Britain _____ 260—897

OTHER REFERENCES

Kresser—"Polypropylene" (Text Book), 1960, pp. 104–106.

MURRAY TILLMAN, Primary Examiner

C. J. SECCURO, Assistant Examiner

U.S. Cl. X.R.

260—41 B, 41 C, 45.85, 45.95, 87 GR, 897 A